United States Patent [19]

White

[11] 4,135,180
[45] Jan. 16, 1979

[54] AFTERMIXER AND APPARATUS

[75] Inventor: John R. White, Wadsworth, Ohio

[73] Assignee: The Goodyear Tire & Rubber Company, Akron, Ohio

[21] Appl. No.: 824,365

[22] Filed: Aug. 15, 1977

[51] Int. Cl.² .............................................. B01F 5/06
[52] U.S. Cl. ...................................... 366/336; 425/200
[58] Field of Search ...................... 366/336, 340, 341; 425/200; 264/329

[56] References Cited
U.S. PATENT DOCUMENTS

| 2,422,809 | 6/1947 | Stupakoff | 264/329 |
| 2,460,831 | 2/1949 | Kovaes | 264/329 |
| 2,460,964 | 2/1949 | Adair | 264/329 X |
| 3,605,183 | 9/1971 | Heckrotte | 425/200 |

Primary Examiner—Edward J. McCarthy
Attorney, Agent, or Firm—J. D. Wolfe

[57] ABSTRACT

An aftermixer for an impingement mixer that accumulates initial material from the mixer and then divides the rest of the material into aliquots in a ring cavity before recombining the aliquots as it is charged to a mold.

2 Claims, 3 Drawing Figures

AFTERMIXER AND APPARATUS

This invention relates to an improvement in an impingement mixing and reactive molding apparatus. More particularly, this invention relates to an aftermixer between the impingement mixer and the mold or shaper.

Impingement mixers generally are preferred over mechanical mixers because the impingement mixers can be designed to be of the self-cleaning type, whereas the mechanical mixers have to be cleaned with solvent and a hot air blown after each pour to prevent the mixer from plugging.

This invention can be used with the usual commercial impingement mixers useful in making polyurethanes, such as microcellular foams often termed reaction injection molded (RIM) urethanes. In general, with the preferred molding practice, the impingement mixers have a distribution means to transfer the molding materials from the mixer outlet to the mold cavity. This distribution means is built to open and allow the solidifying material to be removed as part of the sprue to be removed from the molded article. Since in polyurethane molding it is essential that the polyurethane reaction mixture be intimately mixed, the best practice has been to attach an aftermixer to the outlet from the impingement mixer to better assure the desired degree of intimate mixing. These aftermixers have worked generally on the principle of dividing and recombining the stream as it flows to the mold.

FIG. 1 illustrates a prior art sprue design which distributes the urethane mixture radially, but accomplishes little aftermixing, other aftermixers are the harp or series of V's types. In general, these improve the quality of the mixture, but do not distribute the urethane mixture radially about a mold.

The nature of this invention and its specific advantages can be more readily appreciated by reference to the drawings wherein.

Figure 1:
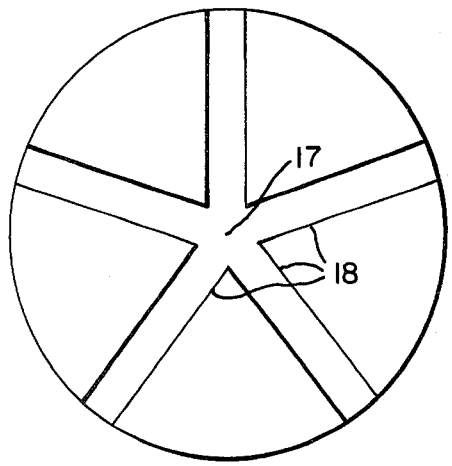
FIG. 1 is a plan view in section of one of the prior art distribution sprues.

Applicant has discovered that the reason for the lack of uniformity in the polyurethanes molded with the sprue shown in FIG. 1 is caused by several factors, (1) initially the ratio of isocyanate resin to other resin is different from the bulk of the pour, (2) the initial material exiting the impingement mixer may be contaminated with moisture in the air or be air cut, (3) the initial material being divided and recombined is of different composition from the bulk of the pour, (4) the back pressure on the impingement mixers may vary from start to the end of the pour, and (5) this often does a poor job of dividing and working the stream. He further has discovered that he can avoid this non-uniformity in the composition of the molded article by using an aftermixer of the design best seen in FIG. 2. An aftermixer of this design avoids or reduces the problems enumerated above because the initial material from the outlet 5 of the impingement mixer 6 flows into the opening 7 of the aftermixer 8 and into the dead legs 9. In the dead legs 9 the mixture of varying isocyanate to polyol composition is stored while the mixture of more uniform compositions is divided by the after ring 10 and caused to flow to the exit arms 11 where it is recombined and mixed with another aliquot of the mixture before being forced into the distribution system 12, to feed the mold cavity 13 of the mold formed by juxtapositioning an automobile wheel 14 on top 15 of the lower mold part 16.

Figure 2:
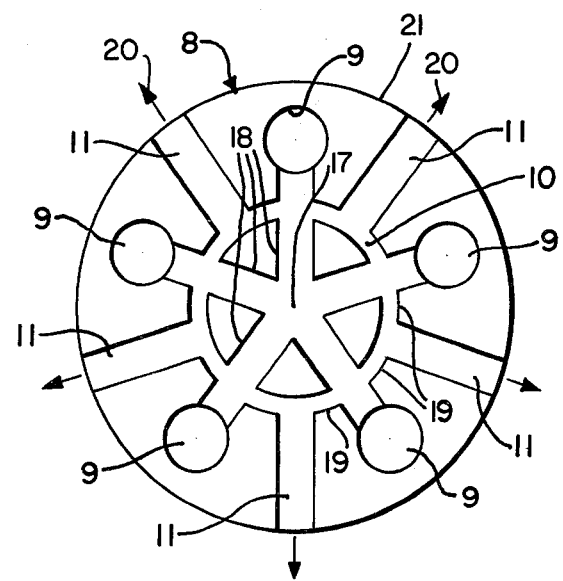
FIG. 2 is a plan view in section of the aftermixer of this invention.

When the aftermixer of FIGS. 1 and 2 are compared, it is evident that these circular disc-like aftermixers both have central inlet openings 17 to receive the molding composition from the outlet 5 of the impingement mixer with said central inlet opening 17 having communication with a set of at least three equally spaced elongated hollow cavities or spokes 18 radiating outward from the opening 17 in spoke-like manner to distribute the material pumped from the impingement mixer. In FIG. 1 the spokes 18 deliver the material to the cavity of the mold where it fills the mold to form the molded article. On the other hand, the spokes 18 of FIG. 2 terminate in an enlarged cavity 9, in this case a circular cavity 9 which acts as a dead leg to store or accumulate the initial portion of the mold charge. Then, when the dead leg is filled, the pressure in the spoke builds up to force the charge to divide and flow along the circular cavity 19 until it comes to a second set of radially extending spokes or cavities 11. The second set of spokes 11 radiating outward causes the divided streams to be recombined and then be moved to the mold cavity 13 as shown by arrow 20. The material, i.e., the liquid polyurethane reaction mixture, fills the mold cavity, sets, and cures. Then the mold is opened to permit the mold article to be stripped. At the same time the circular disc of aftermixer 8 opens at line 21 to permit the material in the cavity of the aftermixer to be removed as part of the sprue of the molded article. The sprue is removed in normal manner to give the sprue free molded article.

The impingement mixer can be any of those known to the art, such as a Hennecke, Kraus Maffei, or Admiral machines.

Figure 3:
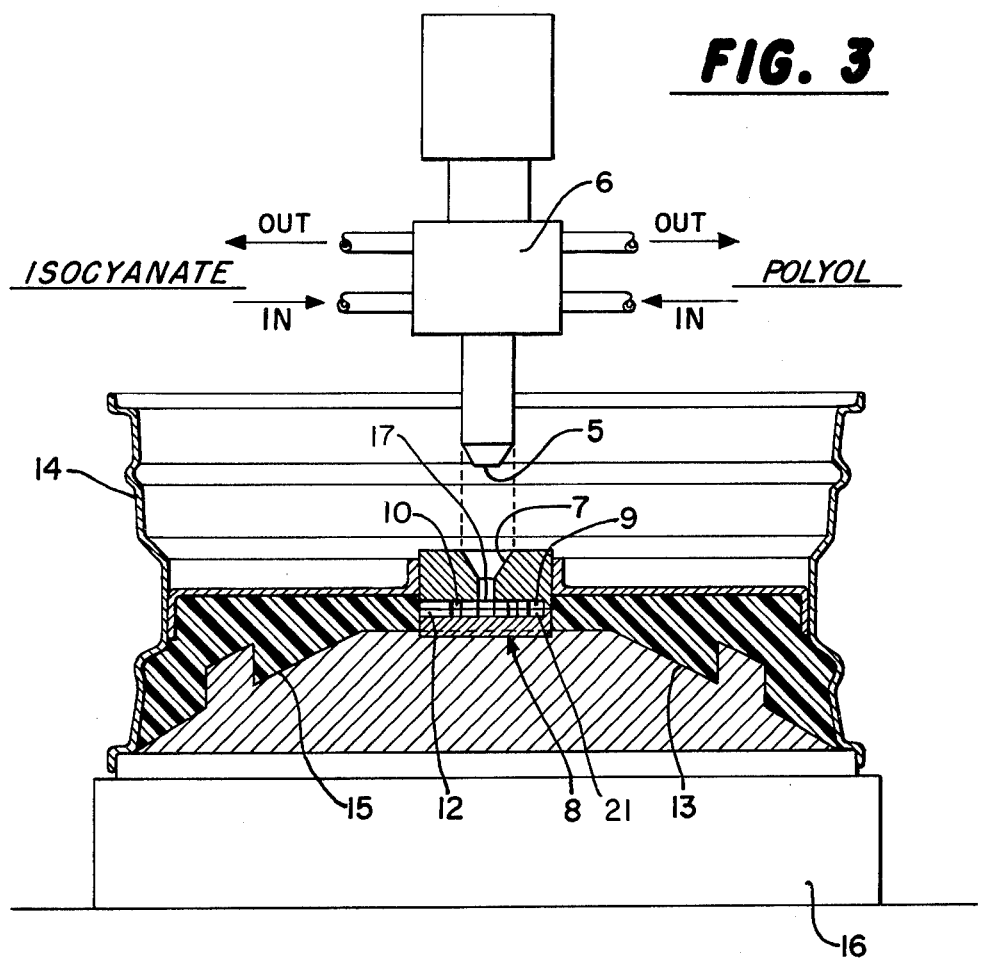
FIG. 3 is an elongated view in section of the mold and aftermixer with an impingement mixer in skeletal form located above the mold in position to charge the mold through the charge distribution system.

The embodiment of FIGS. 2 and 3 have been shown with at least one after-ring 10 and exit arms 11 but additional after-rings can be positioned in the exit arms where additional mixing is desired.

This invention is particularly desirable where automobile facia, bumpers are being molded with a liquid polyurethane reaction mixture such as that of Example 1 of U.S. Pat. No. 3,892,691 on a Kraus Maffei foam machine.

What is claimed is:

1. An aftermixer for use in line with an impingement mixer to achieve improved mixing of a molding composition as it moves to a shaper, comprising an aftermixer member having an inlet opening connected by cavities therein to a series of outlet openings to permit the molding composition to move through the aftermixer to the shaper, said inlet opening of said mixer being connected to at least three outward radiating elongated hollow cavities that terminates in an enlarged accumulation chamber, each of said outward radiating elongated cavities having an interconnecting cavity positioned between them at a point past midpoint of distance from the inlet opening to the enlarged accumulation chamber, each interconnecting cavity having an elongated hollow cavity projecting outward therefrom to an outlet opening.

2. The aftermixer of claim 1, wherein the enlarged cavity is circular in shape.

* * * * *